3,360,946
LOW TEMPERATURE PROCESS FOR THE RECOVERY OF ETHANE FROM A STRIPPED NATURAL GAS STREAM
Robert N. Di Napoli, North Bellmore, N.Y., assignor to National Distillers and Chemical Corporation, New York, N.Y., a corporation of Virginia
Filed Apr. 29, 1966, Ser. No. 546,389
21 Claims. (Cl. 62—28)

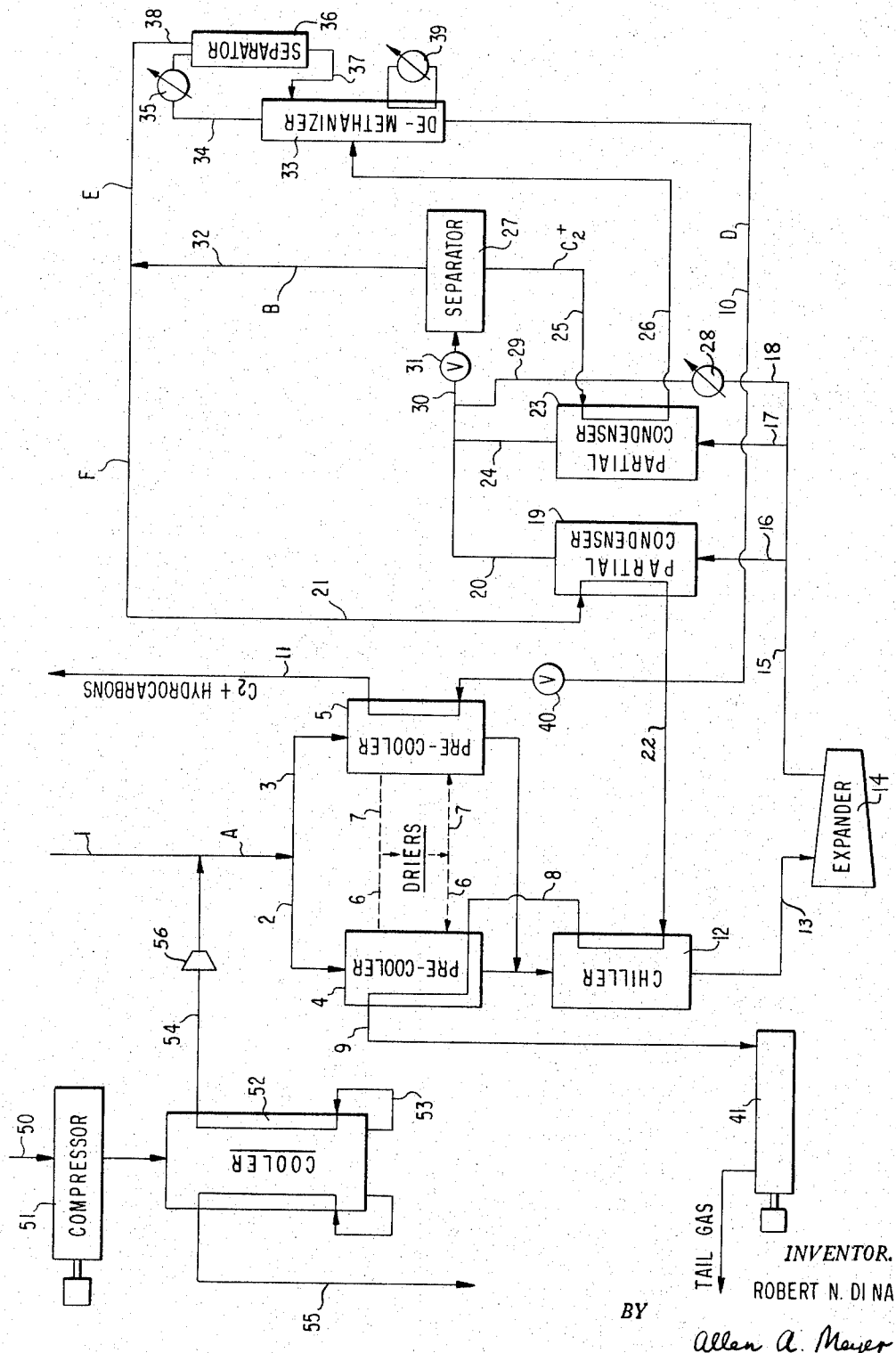

The present invention relates to an economical process for the recovery of ethane and heavier components from a stripped or lean natural gas stream.

The natural gas streams from which ethane and heavier hydrocarbons are recovered in accordance with the invention in most instances have been stripped of propane and heavier components and a large portion of ethane in a lean oil absorption plant. The recovery of additional, worthwhile amounts of $C_2+$ hydrocarbons from such streams has previously been considered to be uneconomical.

Known techniques for removing $C_2+$ hydrocarbons from natural gas streams have frequently involved processing at reduced temperatures and pressures which result in the condensation of a substantial amount of methane as a liquid. Such processes also commonly result in a large decrease in pressure of the gas stream during processing so that a great deal of energy is required to return the tail gas at pipeline pressure.

Therefore, the primary object of the present invention is to provide an improved method for efficiently recovering $C_2+$ hydrocarbons from a stripped or lean natural gas stream. A further objective is to accomplish this recovery with a minimum requirement of external power for compression or refrigeration. An additional object is to recover $C_2+$ hydrocarbons from a natural gas stream without substantial condensation of methane. An additional object is to recover $C_2+$ hydrocarbons from a lean gas feed by a method which minimizes the pressure differential between the feed gas and the tail gas.

In accordance with the present process, it has been found that ethane and heavier components may be economically recovered from a lean natural gas stream by a process which generally comprises:

(a) Providing a lean natural gas feed at a pressure in excess of about 450 p.s.i.a., and preferably in the range of from 450 to 800 p.s.i.a., (b) Pre-cooling the feed to a temperature, generally on the order of from $-75°$ to $-110°$ F., such that on subsequent expansion, the temperature is reduced to a level at or near the hydrocarbon dew point of the gas, (c) Expanding the feed gas as described in (b), preferably by passing it through an expander such as an expansion turbine or an expansion engine to reduce the temperature to a value in the range of from about $-90°$ to $-125°$ F. and to reduce the pressure to a value above about 400 p.s.i.a., and preferably in the range of from 400 to 600 p.s.i.a., (d) Cooling the incoming gas stream by (1) indirect heat exchange with tail gas and the liquid $C_2+$ hydrocarbons condensate stream and (2) further expansion to form a liquid condensate rich in ethane and heavier components and, (e) Separating the liquid condensate from the vapor fraction, preferably by flashing into a suitable separation chamber.

The liquid condensate is then preferably used for heat exchange in the pre-cooling step and is de-methanized. The vapor fraction, primarily containing methane, is joined with de-methanized overhead vapors and is also preferably recycled for indirect heat exchange with the incoming gas stream in steps (d) and (b) to effect cooling of the gas prior to the condensation stage.

In one variation of the process, the lean natural gas feed first may be enriched by transferring a $C_2+$ hydrocarbons fraction from one or more other natural gas streams to the feed stream. The manner in which enrichment of the feed is accomplished is described more fully below. Ordinarily, lean natural gas streams have a $C_2+$ content on the order of about 3.5 mol percent. The present process is highly efficient in the recovery of the $C_2+$ fraction from such gas streams, whether or not they have been enriched as described below.

More specifically, in accordance with the invention, a lean natural gas feed is provided under a pressure in excess of 450 p.s.i.a. and preferably in the range of from 450 to 800 p.s.i.a., and at a temperature near ambient. The gas feed is then pre-cooled, preferably by indirect heat exchange with effluent tail gas, and then is preferably passed through a battery of fixed bed driers to dry the gas composition. It will be understood that the temperatures stated in the present specification are illustrative for a specific gas feed and may vary considerably depending upon the composition of the gas stream.

The gas stream is then further pre-cooled by indirect heat exchange with effluent tail gas and the $C_2+$ hydrocarbons product stream to reduce the temperature of the feed into the range of from $-75°$ to $-110°$ F.

The gas feed is then expanded through an expander to reduce the pressure to above about 400 p.s.i.a. and preferably in the range of from 400 to 600 p.s.i.a. The expansion brings about a reduction in the temperature of the gas stream to a value in the range of from $-90°$ to $-125°$ F.

The temperature at the inlet to the expander is adjusted such that the discharge temperature is a few degrees above the hydrocarbon dew point temperature, thus avoiding the formation of liquid in the expander. The fact that the composition of the gas is high in methane and low in ethane and heavier components permits expansion of the gas to a relatively low temperature without condensation of liquid. The reduction in the temperature difference between the cooling feed gas stream and the warming tail gas stream which normally occurs near the dew point of the feed gas is thus avoided by expansion of the gas at this point, thereby eliminating the need for supplemental refrigeration at this point in the process. The work derived from the expansion is recovered and used to offset the refrigeration and recompression utility requirements of the system.

The gas is then further cooled by indirect heat exchange with the effluent tail gas and hydrocarbon condensate streams. In this manner, the gas is additionally cooled to a temperature in the range of from $-100°$ to $-135°$ F.

The feed is then again expanded, preferably by a pressure letdown through a throttling valve, to yield a liquid condensate phase containing nearly 70% of the ethane contained in the original feed gas.

The liquid condensate-vapor mixture is then separated. This is preferably accomplished by flashing into a separator drum from which the liquid condensate is withdrawn and the vapors are flashed overhead.

The liquid condensate stream withdrawn from the separator drum is partially vaporized by heat exchange with the feed gas and is then introduced into a de-methanizing tower. In the tower, the overhead vapors are removed and combined with the flash vapors from the separation drum, are recycled for heat exchange cooling of the feed gas and are then recompressed and returned to the pipeline.

The de-methanized liquid ethane and heavier fraction is then recycled in heat exchange with the feed gas which vaporizes the condensate so that the product $C_2+$ hydrocarbons may be withdrawn as a gas.

If desired, the initial lean gas stream may be enriched by the transfer of ethane and/or heavier hydrocarbons from one or more independent natural gas streams. Ethane and/or heavier hydrocarbons are recovered from such gas streams by compressing and cooling the gas stream to condense a $C_2+$ fraction, heat exchanging the condensed $C_2+$ fraction with the incoming gas to recover a portion of the refrigeration requirements and to re-vaporize the fraction and then combining the re-vaporized fraction with the lean gas stream to provide an enriched feed.

The invention will be more fully appreciated in the light of the following detailed example considered with reference to the accompanying drawing.

The single figure of the drawing is a flow diagram of a preferred embodiment of the process as illustratively described in connection with the example set forth below.

*Example*

A stream of lean natural gas is introduced into the system at a pressure of 610 p.s.i.a. and a temperature of 100° F. The gas feed has the following approximate composition:

| | Mol percent |
|---|---|
| $CO_2$ | — |
| $N_2$ | 0.31 |
| $CH_4$ | 96.05 |
| $C_2H_6$ | 3.05 |
| $C_3H_8$ | 0.45 |
| $iC_4H_{10}$ | 0.06 |
| $nC_4H_{10}$ | 0.03 |
| $iC_5H_{12}$ | 0.01 |
| $nC_5H_{12}$ | 0.04 |
| | 100.00 |

The feed stream may also contain some carbon dioxide. Depending on its concentration, the feed gas may be pretreated by known techniques to remove carbon dioxide or reduce the content below contaminating levels. Feed gas containing concentrations of carbon dioxide in the range of 1 mol percent may be processed without treatment. In this case, the major portion of carbon dioxide will concentrate in the $C_2+$ hydrocarbons product stream.

The feed gas is introduced through conduit 1 and is split into two streams in conduits 2 and 3. Streams 2 and 3 are passed through pre-coolers 4 and 5, respectively, reducing the temperature of the gas to about 50° F. During the pre-cooling, the gas streams are withdrawn from pre-coolers 4 and 5 through conduits 6 and 7 and are passed through a battery of fixed bed driers containing activated alumina absorbent for drying the gas to reduce the water vapor dew point to about −70° F. The dried gas stream is again split and returned to pre-coolers 4 and 5 where the temperature of the gas is reduced to about −50° F.

The gas cooling requirement in pre-cooler 4 is provided by effluent tail gas introduced through conduit 8 and withdrawn through conduit 9. The temperature of the tail gas is approximately −70° F. at the input side of the pre-cooler and approximately 85° F. on the output side.

The gas cooling requirements of pre-cooler 5 are met primarily by indirect heat exchange with the liquid hydrocarbon product stream which is recycled from the de-methanizer through conduit 10 into the pre-cooler and is then withdrawn through conduit 11. The temperature of the hydrocarbon product stream on the input side of pre-cooler 5 is approximately −58° F. and the temperature on the output side is approximately 90° F.

The gas feeds from pre-coolers 4 and 5 are then combined at a temperature of about −50° F. and are introduced into chiller 12 where the temperature of the gas is further reduced to about −86° F. The gas feed is withdrawn through conduit 13 and, at this point, due to normal pressure drop in the system, the gas is under a pressure of approximately 600 p.s.i.a.

The gas cooling requirements of chiller 12 are furnished by tail gas which is introduced through conduit 22 and withdrawn through conduit 8. Indirect heat exchange with the feed is effected in chiller 12. The temperature of the tail gas at the input side of the chiller is about −111° F. and at the output side is about −70° F.

The gas feed is then expanded through an expansion engine 14 to recover available energy which is used to offset partially the refrigeration and recompression utility requirements. In this manner, about 1/6 of the process energy requirements are recovered.

The expansion results in a reduction of the temperature of the gas to about −106° F. and a reduction of the pressure to about 490 p.s.i.a. The gas feed is withdrawn from expander 14 through conduit 15 and is split into three portions in conduits 16, 17 and 18.

The gas in conduit 16 is introduced into a partial condenser 19 and is withdrawn from the condenser 19 through conduit 20 at a temperature of approximately −126° F. The refrigeration requirements of partial condenser 19 are provided by effluent tail gas which is recycled for heat exchange in condenser 19 and is then withdrawn through conduit 22. The temperature of the effluent tail gas on the input side of condenser 19 is approximately −137° F. and on the output side is approximately −111° F. As described above, the effluent tail gas from condenser 19 is then conducted through chiller 12 for additional heat exchange cooling of the feed gas.

The portion of the gas feed in conduit 17 is introduced into another partial condenser 23 and is withdrawn through conduit 24. The refrigeration requirements of condenser 23 are furnished by indirect heat exchange with the liquid condensate stream from separator 27 which is introduced into condenser 23 through conduit 25 and is withdrawn from condenser 23 through conduit 26. The liquid condensate stream in conduit 25 contains $C_2+$ hydrocarbons and a substantial amount of methane. The temperature of this liquid on the input side of condenser 23 is about −129.5° F. and on the output side is about −123.5° F. This increase in temperature results in about a 40% partial re-vaporization of the condensate.

The portion of the feed in conduit 18 is passed through refrigerating exchanger 28 which reduces the temperature of this portion of the stream to about −126° F. The gas stream exits from refrigerator exchanger 28 through conduit 29 and is combined with the gas streams from conduits 20 and 24 in conduit 30. The refrigeration requirements of exchanger 28 are supplied by a propane-ethylene heat pump system which is integrated with the de-methanizer overhead condenser 35 and de-methanizer re-boiler 39.

With this system, heat is removed in refrigeration exchanger 28 and de-methanizer overhead condenser 35 at approximately the boiling point of ethylene at atmospheric pressure. The ethylene of the heat pump is cascaded against propane in indirect heat exchange relationship. The ethylene vapors are compressed to about 235 p.s.i.a. and are condensed in heat exchange with propane at about atmospheric pressure. The propane vapors are then compressed to approximately 135 p.s.i.a. and are condensed in de-methanizer re-boiler 39.

This is a simplified description of the operation of the ethylene-propane cascade system which involves other intermediate stages, not described in detail.

The gas stream is then throttled through the valve 31 to reduce the pressure to about 465 p.s.i.a. and the temperature to −129.5° F. The stream is flashed into separator 27 where a liquid condensate is collected.

Flash vapors from the separator 27 are taken overhead through conduit 32. The liquid condensate is withdrawn through conduit 25 and, as described, is used for heat exchange in partial condenser 23.

After withdrawal from condenser 23 through conduit 26, the condensate is introduced into de-methanizer 33. Vapors are withdrawn from the de-methanizer through conduit 34, are chilled in refrigerator exchanger 35 and are then introduced into separator 36 where the heavy fraction is separated and returned to de-methanizer 33 through conduit 37. The light vapors are taken overhead in conduit 38 and are joined with the flash vapors from separator 27 and conduit 32 for recycling through conduit 21. The liquid $C_2+$ fraction is collected at the bottom of de-methanizer 33 where it is warmed by heating exchanger unit 39 to strip additional methane and is then withdrawn through conduit 10. The liquid $C_2+$ hydrocarbons product stream withdrawn through conduit 10 is then flashed down through throttling valve 40 and is introduced into pre-cooler 5 at a temperature of about $-58°$ F. and a pressure of 58 p.s.i.a. Upon withdrawal from pre-cooler 5, the product stream is at a temperature of about 90° F. and is entirely in the gaseous state.

The system described may, for example, be operated with an input of about 909.6 MM s.c.f.d., or about 100,000 mols per hour. On such a basis, the $C_2+$ product stream will comprise about 25.5 MM s.c.f.d. or about 89,780 pounds per hour.

On such a basis, at major points in the process, indicated by letters A–F, the compositions of feed and product streams are approximately as shown in the following table:

methane which is condensed, relative to the amount of ethane which is condensed. Thus, in order to recover substantial amounts of $C_2+$ hydrocarbons at lower temperatures, substantially the entire gas stream has to be condensed. However, the present system enables a 70% recovery of ethane to be achieved at a temperature on the order of $-126°$ F. without substantial condensation of methane.

For example, in the process illustratively described above, using a gas feed of the indicated composition, horsepower expended in recovering ethane and heavier components is about 0.3 H.P./lb., and, in recovering ethane is about 0.4 H.P./lb.

It will also be noted that the pressure differential between the feed gas, about 610 p.s.i.a., and tail gas after heat exchange in pre-cooler 4, about 450 p.s.i.a., is limited to about 160 p.s.i.a. Therefore, relatively little energy is required to recompress the tail gas to pipeline pressure. In general, it is a feature of the process that the differential between the pressure of the feed gas and the pressure of the tail gas is kept below about 200 p.s.i., so that recompression power requirements are minimized.

In addition, it should also be noted that the present system enables most of the refrigeration and power requirements of the ethane recovery to be met by the energy contained in the feed gas stream. Feed gas at the pressure indicated is ordinarily available in transmission gas pipelines.

MATERIALS BALANCE TABLE

|  | A | | B | C | D | E | F |
|---|---|---|---|---|---|---|---|
|  | Feed Gas | | $-129°$ F. Vapor, M p.h. | $-129°$ F. Liquid, M p.h. | Demeth. Bottoms, M p.h. | Demeth. Ovhd., M p.h. | Tail Gas, M p.h. |
|  | M s.c.f.d. | M p.h. | | | | | |
| $N_2$ | 2,820 | 310 | 280.1 | 29.9 | | 29.9 | 310.0 |
| $CH_4$ | 873,670 | 96,050 | 71,639.7 | 24,410.3 | 53.9 | 24,365.4 | 95,996.1 |
| $C_2H_6$ | 27,740 | 3,050 | 851.3 | 2,198.1 | 2,088.2 | 109.9 | 961.8 |
| $C_3H_8$ | 4,090 | 450 | 36.4 | 413.6 | 413.6 | | 36.4 |
| $iC_4H_{10}$ | 550 | 60 | 2.9 | 57.1 | 57.1 | | 2.9 |
| $nC_4H_{10}$ | 270 | 30 | 0.1 | 29.9 | 29.9 | | 0.1 |
| $iC_5H_{12}$ | 90 | 10 | | 10.0 | 10.0 | | |
| $nC_5H_{12}$ | 360 | 40 | | 40.0 | 14.0 | | |
| Total | 909,590 | 100,000 | 72,811.1 | 27,188.9 | 2,692.7 | 24,496.3 | 97,307.3 |

The effluent tail gas is preferably recompressed in compressor 41 and is returned to the pipeline at a pressure of 610 p.s.i.a. and a temperature of about 100° F.

As noted above, in one embodiment of the invention, a second gas stream in conduit 50 is introduced into compressor 51, where it is compressed to about 645 p.s.i.a., and then into cooler 52 where it is cooled to about $-85°$ F. A $C_2+$ liquid fraction is condensed, separated and withdrawn through conduit 53, the liquid condensate is then returned in indirect heat exchange relationship with the input gas in cooler 52 to provide at least part of the refrigeration requirements in cooler 52 and to re-vaporize the condensate. The re-vaporized condensate is withdrawn from cooler 52 through conduit 54 and is combined, after recompression in compressor 56, with a lean gas stream for use as a feed in conduit 1 of the system.

The vapor fraction from cooler 52 is also recycled for heat exchange with incoming gas in cooler 52, is withdrawn through conduit 55, after furnishing a part of the refrigerating requirements in cooler 52, and is then returned to the pipeline after recompression.

Refrigeration supplied by partial vaporization of the de-methanized feed and warmup of the effluent tail gas is supplemented by a $-150°$ F. ethylene refrigeration unit in order to cool the expanded feed gas to about $-126°$ F. Optimum expenditure of horsepower per pound of ethane and heavier recovery occurs at about the $-126°$ F. temperature level and justifies the use of supplemental refrigeration horsepower. Cooling below about $-126°$ F. becomes uneconomical because of the large amount of It will thus be seen that the present process provides an efficient and economical method for the recovery of a major proportion of the $C_2+$ hydrocarbons content of a lean natural gas stream.

It will be apparent to those skilled in the art that various modifications may be made in the process as described without departing from the scope of the invention as expressed in the following claims.

What is claimed is:

1. A method for recovering a major portion of the $C_2+$ hydrocarbons content of a lean natural gas stream without substantial condemnation of methane, the $C_2+$ hydrocarbon content being about 3.5% of the feed, comprising
   (a) providing a lean natural gas feed at a pressure in excess of about 450 p.s.i.a.,
   (b) pre-cooling the lean natural gas feed to a temperature on the order of from $-75°$ to $-110°$ F.,
   (c) initially expanding the lean natural gas feed to cool the lean natural gas feed to a temperature in the range of from $-90°$ to $-125°$ F. and to reduce the pressure of the lean natural gas feed to above about 400 p.s.i.a.,
   (d) cooling said expanded lean natural gas feed by indirect heat exchange with tail gas and the liquid $C_2+$ hydrocarbons condensate stream and by further expansion of said expanded lean natural gas feed to form a tail gas and a liquid condensate rich in $C_2+$ hydrocarbons containing the major portion of the $C_2+$ hydrocarbons in the feed, (e) separating said liquid $C_2+$ condensate from said tail gas, (f) heat exchanging said liquid $C_2+$ condensate and said tail gas with said expanded lean natural gas feed in step (d), and (g) recovering the $C_2+$ hydrocarbons as a product.

2. The method of claim 1 wherein the pressure of the lean natural gas in step (a) is in the range of from 450 to 800 p.s.i.a., and in step (c) is in the range of from 400 to 600 p.s.i.a.

3. The method of claim 1 wherein the pressure differential between the lean natural gas feed and tail gas is less than about 200 p.s.i.

4. The method of claim 1 further comprising de-methanizing said $C_2+$ hydrocarbon product stream.

5. The method of claim 4 further comprising combining the methane vapors from said de-methanizing with said tail gas.

6. The method of claim 1 wherein said pre-cooling is accomplished by indirect heat exchange with said tail gas and said liquid $C_2+$ condensate.

7. The method of claim 6 wherein said liquid condensate is re-vaporized by said pre-cooling heat exchange.

8. The method of claim 1 comprising re-compressing said tail gas substantially to pipeline pressure.

9. The method of claim 1 further comprising drying said lean natural gas feed prior to condensation of $C_2+$ hydrocarbons.

10. The method of claim 1 further comprising enriching said lean natural gas feed by compressing and cooling a hydrocarbon gas stream to condense a liquid $C_2+$ hydrocarbons fraction, separating said liquid from the balance of said hydrocarbon gas stream, cooling said hydrocarbon gas stream and re-vaporizing said liquid $C_2+$ hydrocarbons fraction by indirect heat exchange between said liquid and said hydrocarbon gas stream, re-compressing the revaporized $C_2+$ hydrocarbon fraction and introducing said fraction into said lean natural gas feed.

11. The method of claim 1 wherein the expansion of the lean natural gas feed in step (c) is carried out in an expander and the work thus derived from said expansion is utilized to furnish at least part of the energy requirements of the process.

12. The method of claim 1 wherein said lean natural gas feed has substantially the following composition:

$CH_4$—about 95%
$C_2$ hydrocarbons—about 3.5%
$CO_2$—less than about 1%
$N_2$—the balance.

13. A method for recovering a major portion of the $C_2+$ hydrocarbons content of a lean natural gas stream without substantial condensation of methane, the $C_2+$ hydrocarbon content being about 3.5% of the feed, comprising (a) providing a lean natural gas stream at about 600 p.s.i.a. and 100° F., (b) pre-cooling the lean natural gas stream to a temperature of about $-86°$ F. by indirect heat exchange with an effluent tail gas and a $C_2+$ hydrocarbons product stream, (c) initially expanding said lean natural gas feed through an expander to cool said lean natural gas feed to a temperature of about $-106°$ F. and to reduce the pressure of the lean natural gas feed to about 490 p.s.i.a., (d) cooling said expanded lean natural gas feed to a temperature of about $-126°$ F. by indirect heat exchange with effluent tail gas and the $C_2+$ hydrocarbons condensate stream, (e) reducing the pressure of said expanded lean natural gas feed to about 465 p.s.i.a. to reduce the temperature of the expanded lean natural gas feed to about $-129°$ F. and to condense a liquid fraction rich in $C_2+$ hydrocarbons containing the major portion of the $C_2+$ hydrocarbons in the feed, (f) separating said liquid $C_2+$ fraction from the effluent tail gas remainder of said feed, (g) heat exchanging said liquid $C_2+$ fraction and said tail gas remainder with said expanded lean natural gas feed in step (d), and (h) recovering the $C_2+$ hydrocarbons as a product.

14. The method of claim 13 wherein the pressure differential beween the lean natural gas feed and tail gas is less than about 200 p.s.i.

15. The method of claim 13 further comprising de-methanizing said $C_2+$ hydrocarbon product stream.

16. The method of claim 14 further comprising combining the methane vapors from said de-methanizer with said tail gas.

17. The method of claim 13 wherein said liquid $C_2+$ condensate is re-vaporized by said heat exchange.

18. The method of claim 13 comprising recompressing said tail gas substantially to pipeline pressure.

19. The method of claim 13 further comprising drying said lean natural gas feed prior to condensation of $C_2+$ hydrocarbons.

20. The method of claim 13 further comprising enriching said lean natural gas feed by compressing and cooling a hydrocarbon gas stream to condense a liquid $C_2+$ hydrocarbons fraction, separating said liquid from the balance of said hydrocarbon gas stream, cooling said hydrocarbon gas stream and revaporizing said liquid $C_2+$ hydrocarbons fraction by indirect heat exchange between said liquid and said hydrocarbon gas stream and introducing said re-vaporized $C_2+$ hydrocarbons fraction into said lean natural gas feed.

21. The method of claim 13 wherein said lean natural gas feed has substantially the following composition:

$CH_4$—about 95%
$C_2$ hydrocarbons—about 3.5%
$CO_2$—less than about 1%
$N_2$—the balance.

References Cited

UNITED STATES PATENTS

| | | | |
|---|---|---|---|
| 2,823,523 | 2/1958 | Eakin et al. | 62—28 XR |
| 2,940,271 | 6/1960 | Jackson | 62—23 XR |
| 3,181,307 | 5/1965 | Kuerston | 62—23 |
| 3,205,669 | 9/1965 | Grossmann | 62—38 XR |
| 3,318,103 | 5/1967 | Jakob | 62—24 XR |

WILBUR L. BASCOMB, JR., *Primary Examiner.*

NORMAN YUDKOFF, Examiner.

V. W. PRETKA, *Assistant Examiner.*